W. EBERHARD.
Oatmeal-Machine.
No. 224,283. Patented Feb. 10, 1880.
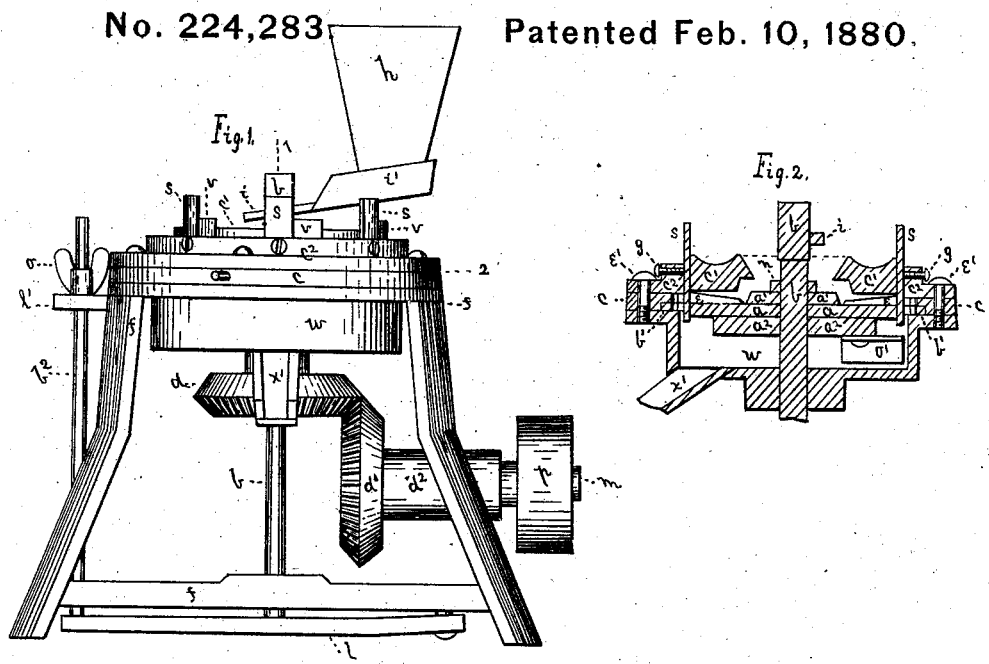
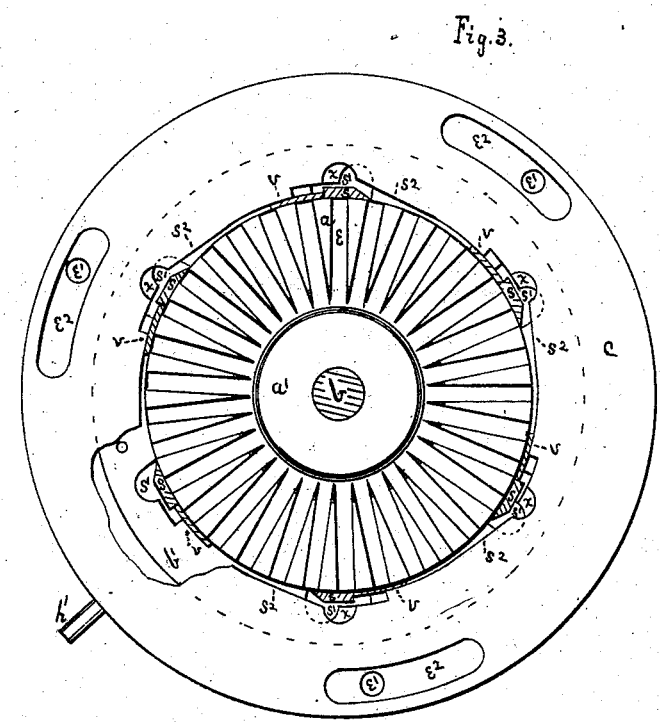
Witnesses
George F. Robinson
A. D. Knapp
Inventor
William Eberhard
by Bradford Howland
his attorney

UNITED STATES PATENT OFFICE.

WILLIAM EBERHARD, OF AKRON, OHIO.

OATMEAL-MACHINE.

SPECIFICATION forming part of Letters Patent No. 224,283, dated February 10, 1880.

Application filed November 13, 1879.

*To all whom it may concern:*

Be it known that I, WILLIAM EBERHARD, of Akron, Ohio, have invented new and useful Improvements in Oatmeal-Machines, of which the following is a specification.

My invention relates to that class of oatmeal-machines in which the grain is conducted by the centrifugal force of a rotating disk endwise through radial grooves in its upper side to cutters arranged at the circumference of the grooved disk.

The principal object of my invention is to cut the grain which passes through the radial grooves of the rotating disk into particles of coarse meal whose length is gaged by an adjustable gage-ring, and also to adjust the relative positions of the grooved disk and its cap or cover, which retains the oats in the grooves, for the purpose of varying the dimensions of the radial passages for grain of different sizes, and to relieve them from obstruction whenever they become clogged with grain or meal.

Figure 1 is an elevation of the machine. Fig. 2 is a vertical section of the main part of the machine at the dotted line 1 in Fig. 1. Fig. 3 is a horizontal section at the dotted line 2 in Fig. 1, with a part of gage-ring $c$ broken away.

The shaft $b$ of the radially-grooved disk $a$ is rotated in frame $f$ by beveled wheels $d$ $d'$, the power being applied to pulley $p$ on main shaft $m$. Disk $a$ is firmly compressed between collars $a'$ $a^2$ by turning nut $n$ on a threaded part of shaft $b$, and thereby prevented from turning loose on its shaft, collar $a^2$ being keyed to the shaft. Disk $a$ has in its upper side horizontal radial grooves $e$, extending from collar $a'$ to the circumference of the disk. Its grooves are covered by cap $c'$, which has a central opening for the admission of grain to the disk. These grooves, whose bottoms are horizontal, are of sufficient width and depth at or near the circumference of the disk to contain an oat-kernel only when lying lengthwise in the groove; but at or near collar $a'$ their depth is very slight, for the purpose of allowing the oat-kernels which fall from hopper $h$ on collar $a'$ to pass from thence on the disk under cap $c'$ in any position, and to become adjusted, after reaching the disk, to a position lengthwise in grooves $e$. The wedge-shaped projections on the disk formed by and between grooves $e$, being thin and of slight depth where the oats fall on them, materially aid in adjusting the oats to the grooves by the rotation of disk $a$ beneath the stationary cap $c'$. The disk is covered by cap $c'$ to retain the grain in grooves $e$ until it is cut into meal. Cap $c'$ has a sleeve, $c^2$, which is bolted through its flange to frame $f$. It is grooved across its inner circumference to admit knives $s$ and guards $v$ between it and cap $c'$, where the knives are adjustably held against the circumference of cap $c'$ by set-screws $g$ through sleeve $c^2$.

Knives $s$ may be of any desired length, their upper ends projecting above cap $c'$, and their cutting-edges projecting downward across the circumference of disk $a$ and close to the outer ends of grooves $e$. By the rotation of disk $a$ the oats projecting beyond the outer ends of grooves $e$ are severed by contact with knives $s$.

The circular vessel or cup $w$ beneath disk $a$, and into which the meal falls from knives $s$, is bolted through its flange to the top of the upright parts of frame $f$, and forms a part of the frame of the machine. Its inside diameter is enough greater than the diameter of disk $a$ to allow space for the meal to fall into it from the circumference of the disk.

On the top of cup $w$ is placed a thin ring, $b'$, which fits the circumference of disk $a$ just below grooves $e$, to prevent oats, before being cut, from falling from the outer ends of grooves $e$ into cup $w$. It is connected by a pin with frame $f$ to prevent its turning. It is grooved across its inner circumference to form openings $s'$ for knives $s$ to enter and for meal to fall through into cup $w$. Ring $b'$ is narrower than gage-ring $c$, which has an annular recess formed in its under side for ring $b'$ to enter. The inside of gage-ring $c$ is opposite to the outer ends of grooves $e$, and is formed into a series of eccentric or inclined gages, $s^2$, and openings $x$.

Gages $s^2$ arrest the oats which project beyond grooves $e$ for knives $s$ to sever. Openings $x$ are over openings $s'$ in ring $b'$, and are for a similar purpose. Sleeve $c^2$ and gage-ring $c$ are fastened to frame $f$ by screw-bolts $e'$, which pass through slots $e^2$ in gage-ring $c$, for the purpose of allowing the gage-ring to be turned for adjustment of gages $s^2$. This adjustment is made by loosening screw-bolts $e'$, and then turning gage-ring $c$ by a pin or handle, $h'$, inserted in a hole in its circumference.

By turning or moving handle $h'$ to the left the distance from gages $s^2$ to the knife-edges is increased, and by turning to the right it is diminished, and the length of the particles of meal to be severed is thereby determined. When the adjustment has thus been made screw-bolts $e'$ are to be again tightened. Guards $v$ are thin strips of iron or steel placed in contact with the backs of knives $s$, with their lower ends resting on ring $b'$, and prevent the oats from passing out of grooves $e$ into openings $x$ back of the knives.

Shoe $i'$, which conducts the grain from hopper $h$ into the opening in the center of cap $c'$, has a rod, $i$, extending beyond and in contact with one side of shaft $b$, (which is of angular form above cap $c'$,) for the purpose of giving a shaking motion to shoe $i'$ by the rotation of shaft $b$.

Main shaft $m$ has its bearings in sleeve $d^2$, attached to or forming a part of frame $f$. The bottom of shaft $b$ rests on bar $l$, one end of which is pivoted to the frame, and the other end is connected with and upheld by rod $b^2$. The upper part of rod $b^2$ is threaded and extends through and above lug $l'$, attached to the frame.

By turning thumb-screw $o$ on rod $b^2$, in contact with the upper side of lug $l'$, bar $l$, shaft $b$, and disk $a$ may be easily and quickly raised or lowered sufficiently to adjust disk $a$ with reference to cap $c'$ and ring $b'$ without disengaging wheels $d$ and $d'$.

If the grain should become clogged on disk $a$ the disk may thus be slightly lowered sufficiently to dislodge the obstructed grain; but it should not be lowered so far as to permit the grain to lie crosswise of and above grooves $e$.

When very small oats are to be cut disk $a$ may be lowered by turning thumb-screw $o$ until the outer ends of grooves $e$ are partially closed by ring $b'$, and cap $c'$ may be adjusted to disk $a$ by loosening screws $g$, which hold it in position.

By the rotation of shaft $b$ a wing or scraper, $o'$, attached to the bottom of collar $a^2$, forces the meal through an opening in the bottom of vessel $w$ into the discharge-spout $x'$.

I claim as my invention—

1. In an oatmeal-machine, a rotating disk, $a$, provided with radial grooves $e$, in combination with knives $s$ and the adjustable ring $c$, having eccentric or inclined gages $s^2$, substantially as described.

2. The rotating radially-grooved disk $a$, in combination with knives $s$, guards $v$, and the adjustable gage-ring $c$, provided with openings $x$, substantially as described.

3. The combination of cap $c'$, sleeve $c^2$, set-screws $g$, and knives $s$ with the radially-grooved disk $a$, substantially as described.

4. The ring $b'$, provided with openings $s'$, in combination with the radially-grooved disk $a$ and knives $s$, substantially as described.

5. The horizontally-rotating disk $a$, provided with radial grooves $e$, whose sides are tapered at their inner ends, in combination with cap $c$ and knives $s$, substantially as described.

WILLIAM EBERHARD.

Witnesses:
BRADFORD HOWLAND,
GEO. F. ROBINSON.